(No Model.)

A. SINGER.
WAGON REACH.

No. 362,231. Patented May 3, 1887.

Witnesses,
Geo. H. Strong.

Inventor,
A. Singer
By Dewey & Co.
Attys

UNITED STATES PATENT OFFICE.

ANANIAS SINGER, OF LOVELOCK, NEVADA.

WAGON-REACH.

SPECIFICATION forming part of Letters Patent No. 362,231, dated May 3, 1887.

Application filed January 6, 1887. Serial No. 223,609. (No model.)

*To all whom it may concern:*

Be it known that I, ANANIAS SINGER, of Lovelock, in the county of Humboldt and State of Nevada, have invented an Improvement in Wagon-Reaches; and I hereby declare the following to be a full, clear, and exact description thereof.

My invention relates to the class of wagons, and especially to the reaches of the running-gear, by which the two axles are connected; and my invention consists in the double-jointed or hinged reach hereinafter described, the object of which is to avoid strain on the reach, and to allow for the motions of the wagon in passing over uneven ground without affecting said reach.

Figure 1:
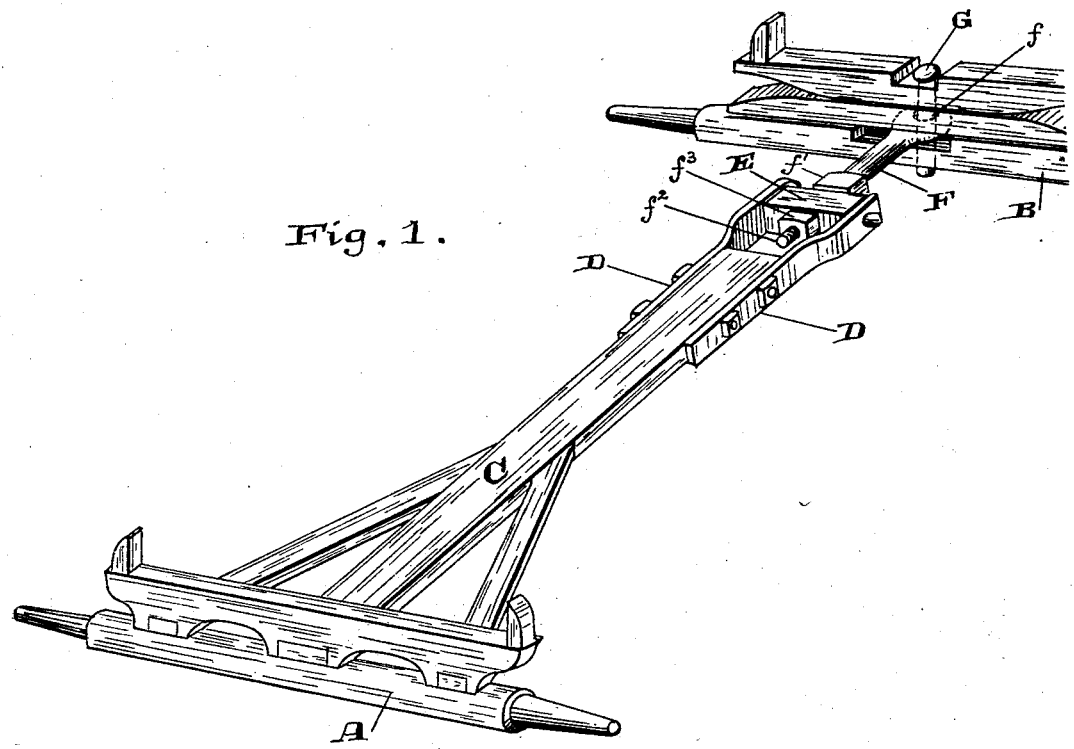
Figure 2:
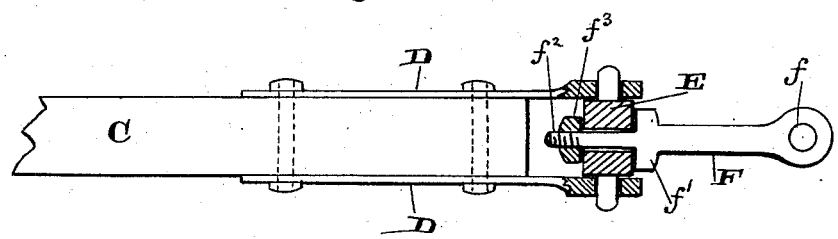

Referring to the accompanying drawings, Figure 1 is a perspective view of my reach, showing it in connection with the axles and bolsters. Fig. 2 is a plan view of the forward end of the reach.

A is the rear axle of the wagon, and B is the forward axle. C is the reach by which they are connected. At the forward end of this reach, and at each side thereof, are bolted the straps D, in the forwardly-projecting ends of which is pivoted a rock-bar, E.

F is a bar having at its forward end an eye, $f$, through which the king-bolt G of the wagon passes. The rear end of the bar is provided with a shoulder, $f'$, and a turned-down threaded portion, $f^2$, which said portion passes freely through a socket in the rock-bar E and receives a nut, $f^3$, on its rear end. It will now be seen that the forward axle has its usual movement on the king-bolt, while the whole running-gear has in addition thereto a movement from side to side around and with the bar F as a center, and a movement up and down around and with the rock-bar E as a center. The reach can thus accommodate itself to the uneven movement of the running-gear by remaining stationary, while its joints permit the motion of the wheels in the ruts or sidling places.

By adjusting itself fully to all the movements of the wagon there is no strain on the reach and no danger of breakage at its end.

Having thus described my invention, what I claim as new, and desire to secure by Letters Patent, is—

1. In a wagon, the reach C, having on its forward end on each side the straps D, a rock-bar, E, pivoted in said straps, the bar F, having an eye on its forward end through which the king-bolt passes, and a threaded rear end pivoted and secured in the rock-bar, substantially as and for the purpose described.

2. A wagon-reach, C, having the side straps, D, the rock-bar E, pivoted in said straps, the bar F, having an eye on its forward end for receiving the king-bolt, a shoulder, $f'$, near its rear end, and a threaded portion, $f^2$, passing freely through the rock-bar and receiving a nut, whereby a double-movement joint and connection is provided, substantially as and for the purpose herein described.

In witness whereof I have hereunto set my hand.

ANANIAS SINGER.

Witnesses:
 JOHN JACKSON WAIT,
 G. W. TERVENER.